US009141490B2

(12) United States Patent
Machida

(10) Patent No.: US 9,141,490 B2
(45) Date of Patent: Sep. 22, 2015

(54) GRACEFUL DEGRADATION DESIGNING SYSTEM AND METHOD

(75) Inventor: Fumio Machida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 79 days.

(21) Appl. No.: 12/747,957

(22) PCT Filed: Dec. 10, 2008

(86) PCT No.: PCT/JP2008/072437
§ 371 (c)(1),
(2), (4) Date: Jun. 14, 2010

(87) PCT Pub. No.: WO2009/081737
PCT Pub. Date: Jul. 2, 2009

(65) Prior Publication Data
US 2010/0293256 A1    Nov. 18, 2010

(30) Foreign Application Priority Data
Dec. 26, 2007    (JP) .................................. 2007-334442

(51) Int. Cl.
*G06F 15/177*    (2006.01)
*G06F 11/20*    (2006.01)
*G06F 11/14*    (2006.01)

(52) U.S. Cl.
CPC ........ *G06F 11/2028* (2013.01); *G06F 11/1484* (2013.01); *G06F 11/2035* (2013.01); *G06F 2201/815* (2013.01)

(58) Field of Classification Search
CPC .................... G05B 2219/14106; H04L 29/06; H04L 29/08072; H04L 29/08981
See application file for complete search history.

(56) References Cited

U.S. PATENT DOCUMENTS

| 5,805,790 A | 9/1998 | Noda et al. |
| 2005/0120160 A1* | 6/2005 | Plouffe et al. ..................... 711/1 |
| 2006/0143498 A1 | 6/2006 | Hatasaki et al. |
| 2009/0070776 A1* | 3/2009 | Dahlstedt ..................... 719/312 |

FOREIGN PATENT DOCUMENTS

| JP | 6-110715 A | 4/1994 |
| JP | H08027735 A | 3/1996 |
| JP | H08263454 A | 10/1996 |
| JP | 2002055840 A | 2/2002 |
| JP | 2003330740 A | 11/2003 |
| JP | 2004062470 A | 2/2004 |
| JP | 2004110509 A | 4/2004 |

(Continued)

OTHER PUBLICATIONS

Japanese Office Action for JP Application No. 2009-547025 mailed on Jul. 30, 2013 with Partial English Translation.

(Continued)

*Primary Examiner* — Jude Jean Gilles
*Assistant Examiner* — Jaren M Means
(74) *Attorney, Agent, or Firm* — Sughrue Mion, PLLC

(57) ABSTRACT

When information about a failed physical server is inputted, the number of processing programs which are insufficient to meet an availability requirement specified in advance is calculated for each subsystem executing on a computer system, and a graceful degradation which meets the availability requirement is determined by changing the quantity of computer resources allocated to processing programs.

7 Claims, 16 Drawing Sheets

(56) References Cited

FOREIGN PATENT DOCUMENTS

| | | |
|---|---|---|
| JP | 2004318578 A | 11/2004 |
| JP | 2005115653 A | 4/2005 |
| JP | 2005242404 A | 9/2005 |
| JP | 2006024214 A | 1/2006 |
| JP | 2006-72591 A | 3/2006 |
| JP | 2006163963 A | 6/2006 |
| JP | 2006164080 A | 6/2006 |
| JP | 2007148839 A | 6/2007 |

OTHER PUBLICATIONS

Japanese Office Action for JP2009-547025 mailed on Dec. 4, 2012.
International Search Report for PCT/JP2008/072437 mailed Mar. 17, 2009.

P. Barham et al., "Xen and the Art of Virtualization", 19th ACM Symposium on Operating Systems Principles (SOS P19), Oct. 2003, pp. 1-14.

* cited by examiner

[AVAILABILITY REQUIREMENTS]

MAXIMUM ALLOWABLE SIMULATANEOUS FAULT:2

MINIMUM OPERATING LEVEL

| SUB-SYSTEM | MINIMUM OPERATING LEVEL |
|---|---|
| APPLICATION A | MINIMUM NUMBER OF SERVERS=1 |
| APPLICATION B | MINIMUM NUMBER OF SERVERS=1 |
| | |

Fig.10

[VIRTUAL SERVER PLACEMENT INFORMATION]

| PHYSICAL SERVER | VIRTUAL SERVER |
|---|---|
| PHYSICAL SERVER1 | APPLICATION A (ACTIVE) |
|  | APPLICATION B (REDUNDANT) |
| PHYSICAL SERVER2 | APPLICATION B (ACTIVE) |
|  | APPLICATION C (REDUNDANT) |
| PHYSICAL SERVER3 | APPLICATION C (ACTIVE) |
|  | APPLICATION A (REDUNDANT) |
|  |  |

Fig. 11

[SERVER SHORTFALL INFORMATION]

| SUBSYSTEM | MINIMUM SERVER COUNT | REMAINING SERVER COUNT | SERVER SHORTFALL |
|---|---|---|---|
| APPLICATION A | 1 | 0 | 1 |
| APPLICATION B | 1 | 1 | 0 |
| | | | |

Fig.12

[GRACEFUL DEGRADATION INFORMATION]

| PHYSICAL SERVER | VIRTUAL SERVER | STATE | TRANSITIONAL REDUCTION |
|---|---|---|---|
| PHYSICAL SERVER1 | APPLICATION A (ACTIVE) | FAILURE | |
| | APPLICATION B (REDUNDANT) | FAILURE | |
| PHYSICAL SERVER2 | APPLICATION B (ACTIVE) | | |
| | APPLICATION C (REDUNDANT) | | |
| PHYSICAL SERVER3 | APPLICATION C (ACTIVE) | | → APPLICATION C (REDUNDANT) |
| | APPLICATION A (REDUNDANT) | | → APPLICATION A (ACTIVE) |
| | | | |

Fig.14

[SYSTEM CONFIGURATION INFORMATION]

THE NUMBER OF PHYSICAL SERVERS=6

THE NUMBER OF APPLICATIONS=3

VIRTUAL SERVER PLACEMENT INFORMATION

| PHYSICAL SERVER | APPLICATION (WORKING) | APPLICATION (REDUNDANT) |
|---|---|---|
| PHYSICAL SERVER 1 | APPLICATION A | |
| PHYSICAL SERVER 2 | APPLICATION A | |
| PHYSICAL SERVER 3 | APPLICATION A | |
| PHYSICAL SERVER 4 | APPLICATION B | |
| PHYSICAL SERVER 5 | APPLICATION B | |
| PHYSICAL SERVER 6 | APPLICATION C | |

Fig.15

[AVAILABILITY REQUIREMENT]

MAXIMUM ALLOWABLE SIMULTANEOUS FAULT : 3

MINIMUM OPERATING LEVEL

| SUBSYSTEM | MINIMUM OPERATING LEVEL |
|---|---|
| APPLICATION A | MINIMUM NUMBER OF SERVERS=1 |
| APPLICATION B | MINIMUM NUMBER OF SERVERS=1 |
| APPLICATION C | MINIMUM NUMBER OF SERVERS=1 |

Fig.16

[VIRTUAL SERVER PLACEMENT INFORMATION]

| PHYSICAL SERVER | APPLICATION (ACTIVE) | APPLICATION (REDUNDANT) |
|---|---|---|
| PHYSICAL SERVER 1 | APPLICATION A | APPLICATION B |
| PHYSICAL SERVER 2 | APPLICATION A | APPLICATION B |
| PHYSICAL SERVER 3 | APPLICATION A | APPLICATION C |
| PHYSICAL SERVER 4 | APPLICATION B | APPLICATION C |
| PHYSICAL SERVER 5 | APPLICATION B | APPLICATION C |
| PHYSICAL SERVER 6 | APPLICATION C | APPLICATION A |

Fig.17

[FAILURE INFORMATION]

FAILED PHYSICAL SERVER={PHYSICAL SERVER1,
PHYSICAL SERVER2,
PHYSICAL SERVER3}

Fig.18

[SERVER SHORTFALL INFORMATION]

| SUBSYSTEM | MINIMUM SERVER COUNT | REMAINING SERVER COUNT | SERVER SHORTFALL |
|---|---|---|---|
| APPLICATION A | 1 | 0 | 1 |
| APPLICATION B | 1 | 2 | 0 |
| APPLICATION C | 1 | 1 | 0 |

Fig.20

[SERVER SHORTFALL INFORMATION]

| SUBSYSTEM | MINIMUM SERVER COUNT | REMAINING SERVER COUNT | SERVER SHORTFALL |
|---|---|---|---|
| APPLICATION A | 1 | 1 | 0 |
| APPLICATION B | 1 | 2 | 0 |
| APPLICATION C | 1 | 0 | 1 |

Fig.21

[SERVER SHORTFALL INFORMATION]

| SUBSYSTEM | MINIMUM SERVER COUNT | REMAINING SERVER COUNT | SERVER SHORTFALL |
|---|---|---|---|
| APPLICATION A | 1 | 1 | 0 |
| APPLICATION B | 1 | 1 | 0 |
| APPLICATION C | 1 | 1 | 0 |

Fig.22

[GRACEFUL DEGRADATION INFORMATION]

| PHYSICAL SERVER | APPLICATION (ACTIVE) | | APPLICATION (REDUNDANT) | |
|---|---|---|---|---|
| | REDUNDANT CONFIGURATION | GRACEFUL DEGRADATION | REDUNDANT CONFIGURATION | GRACEFUL DEGRADATION |
| PHYSICAL SERVER 1 | APPLICATION A | FAILURE | APPLICATION B | FAILURE |
| PHYSICAL SERVER 2 | APPLICATION A | FAILURE | APPLICATION B | FAILURE |
| PHYSICAL SERVER 3 | APPLICATION A | FAILURE | APPLICATION C | FAILURE |
| PHYSICAL SERVER 4 | APPLICATION B | →APPLICATION C | APPLICATION C | →APPLICATION B |
| PHYSICAL SERVER 5 | APPLICATION B | | APPLICATION C | |
| PHYSICAL SERVER 6 | APPLICATION C | →APPLICATION A | APPLICATION A | →APPLICATION C |

GRACEFUL DEGRADATION DESIGNING SYSTEM AND METHOD

The present application is the National Phase of PCT/JP2008/072437, filed Dec. 10, 2008, which claims priority from Japanese patent application No. 2007-334442, filed Dec. 26, 2007, which is incorporated herein by reference in its entirety.

TECHNICAL FIELD

The present invention relates to a graceful degradation designing system and method intended to degrade a redundant computer system constructed using virtual machine technology, in case of failure.

BACKGROUND ART

In a computer system which is constantly required to operate in a stable manner, such as a mission-critical system of a data center or company, reliability is increased by providing redundant servers. By operating redundant servers in addition to minimum necessary servers, even if some of the servers fail, the computer system can provide services stably using the remaining servers.

Regarding conventional server redundancy techniques, for example, Patent Document 1 (Japanese Patent Laid-Open No. 2002-55840A) describes dual-redundancy, N+M configuration, and N+1 configuration. The dual-redundancy involves providing a redundant server (physical server) for every server. The N+M configuration involves providing M redundant physical servers for N servers. A configuration in which M=1, in particular, is referred to as an N+1 configuration.

Even if a physical server fails, the redundancy technique described in Patent Document 1 can continue operating a computer system by cutting off the failed physical server from the computer system. The act of reconstructing a computer system using the remaining physical servers excluding the failed physical server is known as degradation and the configuration resulting from the degradation is called a graceful degradation.

On the other hand, recent mission-critical systems of data centers and companies have been adopting a form in which multiple virtual servers are constructed on a physical server using virtual machine technology.

For example, Non-Patent Document 1 (B. Dragovic, K. Fraser, S. Hand, T. Harris, A. Ho, I. Pratt, A. Warfield, P. Barham and R. Neugebauer, Xen and the Art of Virtualization, 19th ACM Symposium on Operating Systems Principles (SOSP19), 2003.) discloses a technique for using computer resources (a CPU, memory device, and the like) of a physical server as multiple virtual servers implemented by required processing programs.

Non-Patent Document 1 proposes to dynamically change the quantity of computer resources allocated to the virtual servers according to services to be provided. The use of virtual machine technology makes it possible to provide a redundant server for each service-providing subsystem (application program: hereinafter simply referred to as an application) by simply adding virtual servers without introducing new physical servers, and thereby make the computer system redundant at a lower cost.

Generally the total quantity of computer resources available on a physical server is limited. Therefore, with a redundancy technique which uses virtual machine technology, if the quantity of computer resources allocated to virtual servers standing by as redundant virtual servers is increased, there may be some virtual servers which do not meet the quantity of computer resources needed to provide a service because of reduced computer resources.

In particular, with a computer system equipped with multiple subsystems (applications), since a minimum number of virtual servers required for each subsystem (application) is determined based on availability requirements of the subsystem (application), it is necessary to ensure that migration to a graceful degradation will not result in a subsystem (application) which would violate the availability requirements.

However, the redundancy technique described in Non-Patent Document 1 does not take into consideration the effects of changes in the quantity of computer resources allocated to an arbitrary virtual server on other virtual servers, and thus cannot be applied directly to the redundancy technique which uses the virtual machine technology. That is, a technique for migration to a graceful degradation is needed in order to meet the availability requirements of each subsystem (application) running on the computer system.

A related redundancy technique is not provided with a technique for migrating to a graceful degradation by changing the amount of computer resources allocated to virtual servers, and thus cannot determine a graceful degradation according to a failed physical server.

SUMMARY

Thus, an object of the present invention is to provide a graceful degradation designing system and method capable of migrating to a graceful degradation which meets an availability requirement of each subsystem (application) in a computer system made redundant using virtual machine technology.

To achieve the above object, a graceful degradation designing system according to an aspect of the present invention, comprises: input means that is used to enter information about a failed physical server; and graceful degradation determining means that calculates, for each subsystem executing processing programs on a computer system, the number of processing programs which are insufficient to meet an availability requirement specified in advance, that changes a quantity of computer resources allocated to processing programs, and thereby that determines a graceful degradation which meets said availability requirement.

A graceful degradation designing method according to an aspect of the present invention, comprising: calculating, for each subsystem executing on a computer system, the number of processing programs which are insufficient to meet an availability requirement specified in advance when information about a failed physical server is inputted; and determining a graceful degradation which meets said availability requirement by changing the quantity of computer resources allocated to processing programs.

BRIEF DESCRIPTION OF THE DRAWINGS

FIG. 10 is a table showing an example of virtual server placement information used by the redundant configuration design means shown in FIG. 2.

FIG. 11 is a table showing an example of server shortfall information used by the graceful degradation determining means shown in FIGS. 1 and 2.

FIG. 12 is a table showing an example of graceful degradation information outputted from the graceful degradation determining means shown in FIGS. 1 and 2.

FIG. 14 is a table showing an example of system configuration information used by the graceful degradation designing system shown in FIG. 13.

FIG. 15 is a table showing an example of availability requirements inputted in the graceful degradation designing system shown in FIG. 13.

FIG. 16 is a table showing an example of virtual server placement information outputted from redundant configuration design means shown in FIG. 13.

FIG. 17 is a table showing an example of failure information inputted in the graceful degradation designing system shown in FIG. 13.

FIG. 18 is a table showing an example of server shortfall information calculated upon input of the failure information shown in FIG. 17.

FIG. 20 is a table showing an example of server shortfall information obtained by recalculation a server shortfall.

FIG. 21 is a table showing an example of server shortfall information obtained by recalculation a server shortfall.

FIG. 22 is a table showing an example of graceful degradation information outputted from the graceful degradation determining means shown in FIG. 13.

EXEMPLARY EMBODIMENT

Next, the present invention will be described with reference to the drawings.

Figure 1:
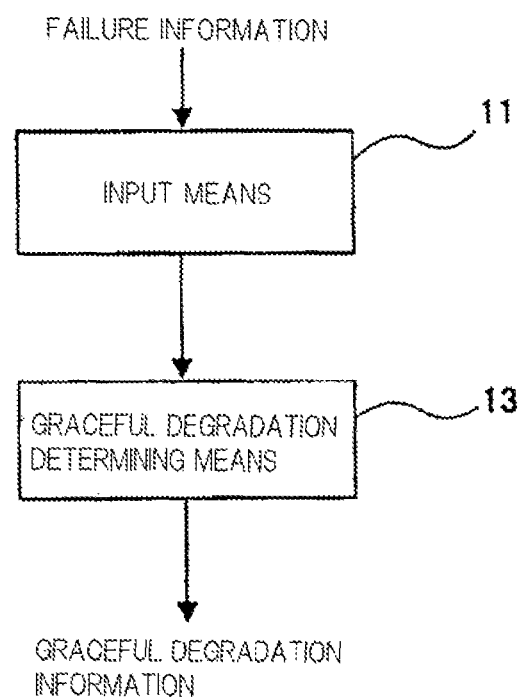
FIG. 1 is a block diagram showing a configuration of a graceful degradation designing system according to an exemplary embodiment.

FIG. 1 is a block diagram showing a configuration of a graceful degradation designing system according to an exemplary embodiment.

Figure 2:
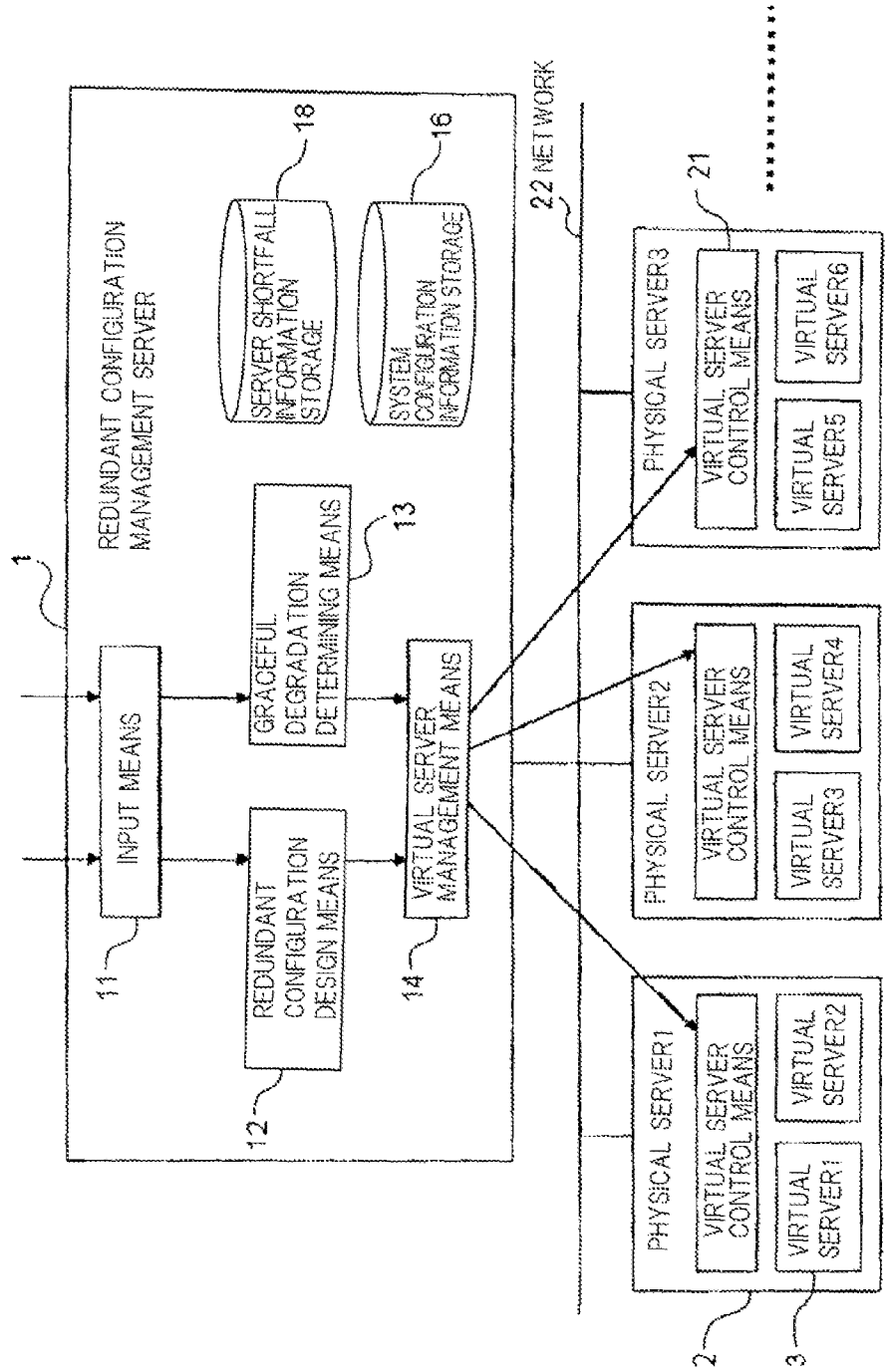
FIG. 2 is a block diagram showing another configuration example of the graceful degradation designing system.
Figure 3:
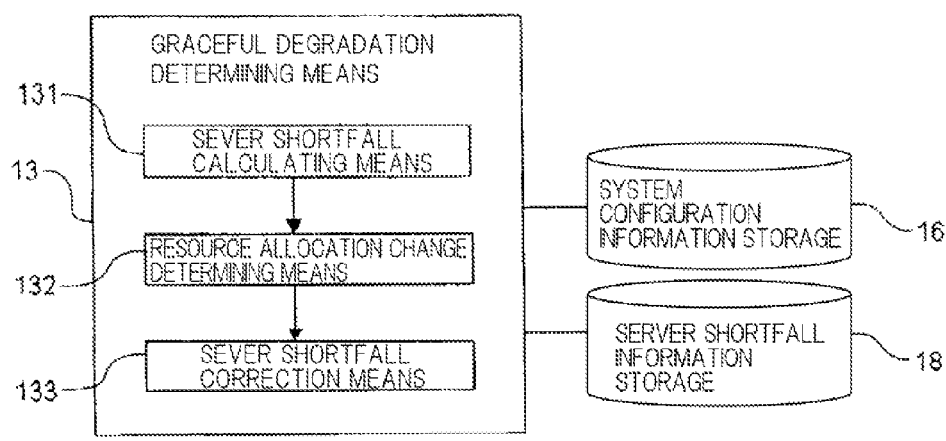
FIG. 3 is a block diagram showing a configuration example of graceful degradation determining means shown in FIGS. 1 and 2.

FIG. 2 is a block diagram showing another configuration example of the graceful degradation designing system and FIG. 3 is a block diagram showing a configuration example of graceful degradation determining means shown in FIGS. 1 and 2.

As shown in FIG. 1, the graceful degradation designing system according to the exemplary embodiment includes input means 11 and graceful degradation determining means 13.

As shown in FIG. 2, the graceful degradation designing system shown in FIG. 1 is used to manage redundant configuration of a computer system which includes multiple physical servers 2 and virtual servers 3 constructed on physical servers 2.

Input means 11 and graceful degradation determining means 13 shown in FIG. 1 are implemented, for example, by graceful degradation management server 1 shown in FIG. 2. Graceful degradation management server 1 is connected with multiple physical servers 2 managed by the graceful degradation designing system, for example, via network 22.

Each physical server 2 includes virtual server control means 21 and uses virtual server control means 21 to control zero or more virtual servers 3 constructed on the local physical server 2.

Graceful degradation management server 1 shown in FIG. 2 includes input means 11, redundant configuration design means 12, graceful degradation determining means 13, virtual server management means 14, system configuration information storage 16, and server shortfall information storage 18. Incidentally, although virtual server control means 21 is shown as being included in each physical server 2 in FIG. 2, virtual server control means 21 may be included in graceful degradation management server 1.

Input means 11 is used, for example, by an administrator who manages the computer system to enter availability requirements specified for the computer system. Also, input means 11 is used to enter information (failure information) about failed physical server 2 by a monitoring system (not shown) which monitors physical servers 2 for failure or by the administrator of the computer system.

The availability requirements include information such as a maximum allowable simultaneous fault count or a minimum operating level, where the maximum allowable simultaneous fault count represents the number of virtual servers 3, or rather, the number of physical servers 2 which are allowed to fail simultaneously before the computer system can no longer continue to operate and the minimum operating level represents a minimum number of virtual servers 3 needed for a service provided by each subsystem (application).

By referring to the availability requirements entered by the administrator and to system configuration information stored in system configuration information storage 16, redundant configuration design means 12 makes the computer system redundant, determines placement of virtual servers with respect to physical servers so as to meet the availability requirements, and outputs information about obtained results (virtual server placement information).

The system configuration information, which represents current configuration of the computer system under management, includes information about the number of physical servers 2 in the computer system, the number of subsystems (applications), the number of virtual servers placed on physical servers 2, and the like.

Based on the virtual server placement information outputted from redundant configuration design means 12, virtual server management means 14 manages virtual servers 3 constructed on each physical server 2.

Virtual server control means 21 accepts various control requests from virtual server management means 14 and controls virtual servers 3 in the local physical server 2 based on the control requests. Possible control requests to virtual server 3 include, for example, generation of virtual server 3, shutdown of virtual server 3, and switching between an active virtual server and redundant virtual server.

If physical server 2 fails after construction of a redundant configuration, information about failed physical server 2 is inputted in graceful degradation determining means 13 via input means 11 by the administrator of the computer system or from the monitoring system (not shown) which monitors physical servers 2 for failure.

As shown in FIG. 3, graceful degradation determining means 13 includes server shortfall calculating means 131, resource allocation change determining means 132, and server shortfall correction means 133.

By referring, for example, to the failure information and availability requirements entered by the administrator and the system configuration information stored in system configuration information storage 16, server shortfall calculating means 131 calculates, for each subsystem (application), the number of virtual servers which are insufficient (hereinafter referred to as lacking servers) in meeting the availability requirements.

Resource allocation change determining means 132 changes the quantity of computer resources allocated to each virtual server 3 so that the lacking servers calculated by server shortfall calculating means 131 will be "0" and outputs information (graceful degradation information) about obtained results.

Server shortfall correction means 133 monitors changes in the number of lacking servers on each subsystem (application) resulting from changes in the quantity of allocated computer resources and updates information stored in server shortfall information storage 18.

Based on graceful degradation information outputted from graceful degradation determining means 13, virtual server management means 14 changes the placement of virtual servers 3 constructed on physical servers 2, using virtual server control means 21.

Figure 4:
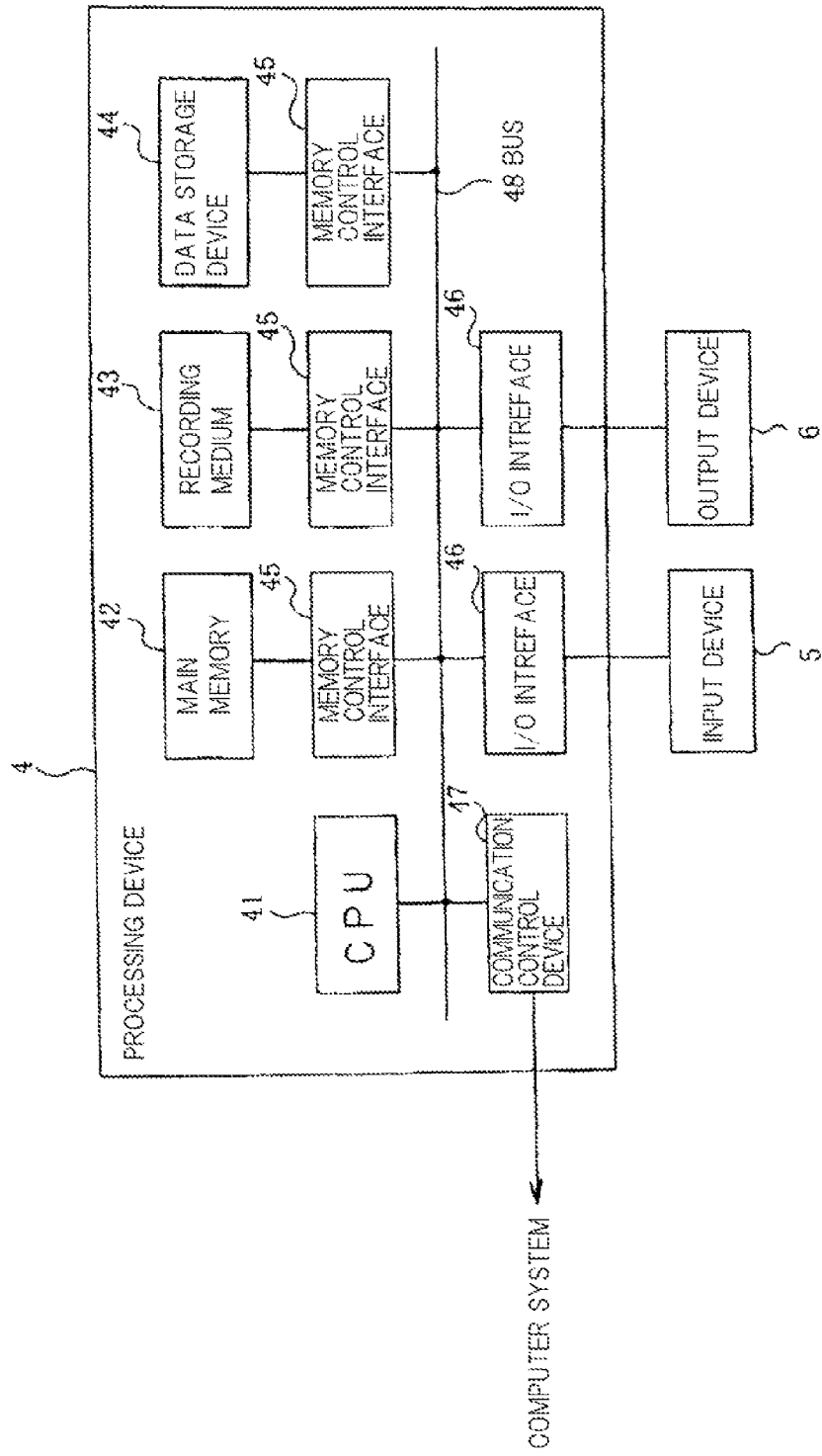
FIG. 4 is a block diagram showing a configuration example which implements the graceful degradation designing system shown in FIG. 1 and a graceful degradation management server shown in FIG. 2.

The graceful degradation designing system shown in FIG. 1 and graceful degradation management server 1 shown in FIG. 2 can be implemented, for example, by a computer shown in FIG. 4.

The computer shown in FIG. 4 includes processing device 4 which performs predetermined processing according to programs, input device 5 used to input commands, information, and the like in processing device 4, and output device 6 used to monitor processing results produced by processing device 4.

Processing device 4 includes CPU 41; main memory 42 which temporarily holds information needed for processing performed by CPU 41; recording medium 43 which contains programs used to make CPU 41 perform processes of redundant configuration design means 12, graceful degradation determining means 13, and virtual server management means 14; data storage device 44 used as system configuration information storage 16 and server shortfall information storage 18; memory control interface 45 which controls data transfer to/from main memory 42, recording medium 43, and data storage device 44; I/O interface 46 which is a device interfacing between input device 5 and output device 6; and communication control device 47 which is an interface for controlling communications with multiple physical servers 2 under management; all of which are interconnected via bus 48.

Processing device 4 performs processes of redundant configuration design means 12, graceful degradation determining means 13, and virtual server management means 14 according to programs recorded on recording medium 43. Incidentally, recording medium 43 may be a magnetic disk, semiconductor memory, optical disk, or the like. Also, data storage device 44 does not always need to be installed in graceful degradation management server 1, and may be an independent device. Physical servers 2 shown in FIG. 2 can also be implemented by the computer shown in FIG. 4 except that physical servers 2 operate according to a different program, and thus description thereof is omitted herein.

Next, a graceful degradation designing method according to the present exemplary embodiment will be described with reference to the drawings.

Figure 5:
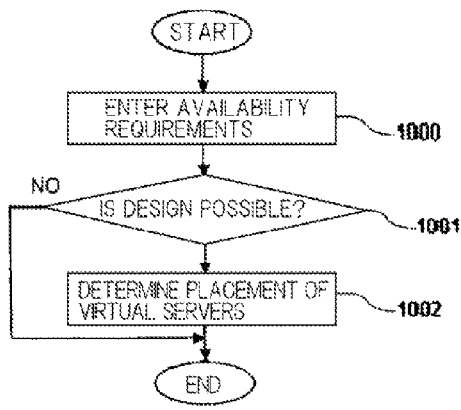
FIG. 5 is a flowchart showing processing procedures of redundant configuration design means shown in FIG. 2.
Figure 6:
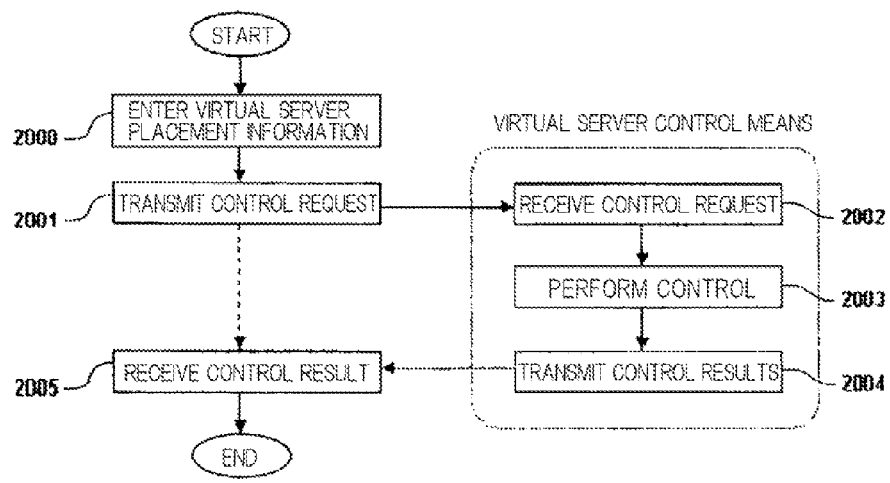
FIG. 6 is a flowchart showing processing procedures for redundant configuration design carried out by virtual server management means and virtual server control means shown in FIG. 2.

FIG. 5 is a flowchart showing processing procedures of the redundant configuration design means shown in FIG. 2 and FIG. 6 is a flowchart showing processing procedures for a redundant configuration design carried out by the virtual server management means and virtual server control means shown in FIG. 2.

As shown in FIG. 5, when the administrator enters availability requirements via input means 11 (Step 1000), redundant configuration design means 12 acquires current system configuration information from system configuration information storage 16, calculates the number of virtual servers 3 which meets the entered availability requirements, checks whether or not the number of virtual servers 3 needed to make the computer system redundant is equal to or smaller than the number of currently available virtual servers 3, and determines whether or not a redundant configuration can be designed (Step 1001).

Figures 8, 9:
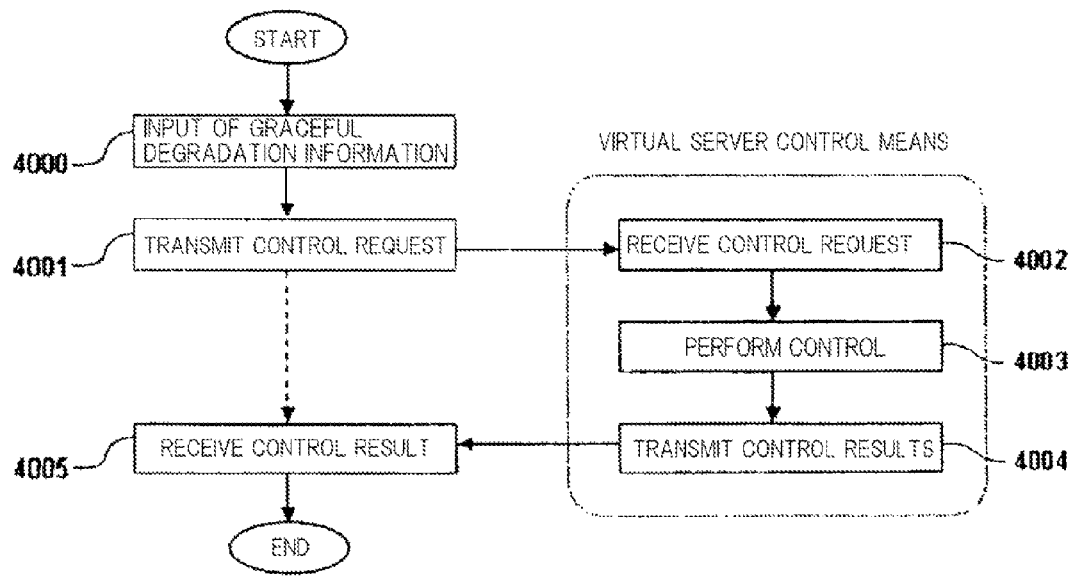
FIG. 8 is a flowchart showing processing procedures for graceful degradation design carried out by the virtual server management means and virtual server control means shown in FIG. 2.
FIG. 9 is a table showing an example of availability requirements used by the redundant configuration design means shown in FIG. 2.

The availability requirements represent a reliability level required of the computer system under management. An example is shown in FIG. 9. FIG. 9 shows an example of the maximum allowable simultaneous fault count and minimum operating level which are availability requirements.

The maximum allowable simultaneous fault count represents the number of failed physical servers 2 allowed in the entire computer system. That is, the maximum allowable simultaneous fault count is an indicator which indicates that the system can continue to operate using a degradation process if the number of failed physical servers 2 does not exceed the maximum allowable simultaneous fault count. The minimum operating level defines a minimum requirement which needs to be met in order to continue operating the computer system. The minimum operating level is set, for example, as a minimum number of virtual servers (hereinafter referred to as a minimum server count) needed for each subsystem (application). When a redundant configuration is designed using virtual machine technology, it is necessary to prepare redundant virtual servers 3 so that the availability requirements are met even in case of a failure.

If it is determined that a redundant configuration can be designed, redundant configuration design means 12 determines placement of virtual servers 3 with respect to physical servers 2 and outputs information about obtained results (virtual server placement information) (Step 1002). If it is determined that a redundant configuration cannot be designed, redundant configuration design means 12 outputs, for example, the number of physical servers 2 to be added for redundancy and finishes processing.

If there is no problem in the virtual server placement information (redundant configuration) outputted from redundant configuration design means 12, virtual server management means 14 and virtual server control means 21 start the process of constructing a redundant configuration.

The construction of the redundant configuration may be started either after the virtual server placement information outputted from redundant configuration design means 12 is confirmed by the administrator or without confirmation by the administrator. In either case, the construction of the redundant configuration is started when the virtual server placement information is inputted in virtual server management means 14.

An example of virtual server placement information is shown in FIG. 10. FIG. 10 shows an example of defining virtual servers 3 running on each physical server 2. In the example shown in FIG. 10, two types of virtual server 3—active and redundant—run on each physical server 2 and three types of subsystem (application) are allocated to each virtual server 3. Also, an active virtual server 3 and redundant virtual server 3 which execute the same application are placed on different physical servers 2. Specifically, an active virtual server running on application A and a redundant virtual server running on application B are placed on a first physical server (physical server 1) while an active virtual server running on application B and a redundant virtual server running on application C are placed on a second physical server (physical server 2). Also, an active virtual server running on application C and a redundant virtual server running on application A are placed on a third physical server (physical server 3).

As shown in FIG. 6, when virtual server placement information is inputted (Step 2000), virtual server management means 14 transmits a control request to virtual server control means 21 on each physical server 2 based on the virtual server placement information (Step 2001).

As described above, possible control requests include generation of virtual server 3, shutdown of virtual server 3, a change from an active virtual server to a redundant virtual server, and a change from a redundant virtual server to an active virtual server.

Upon receiving a control request to virtual server 3 (Step 2002), virtual server control means 21 performs requested control (Step 2003) and transmits control results to virtual server management means 14 (Step 2004).

Upon receiving the control results from virtual server control means 21 of all physical servers 2, virtual server management means 14 finishes the process of constructing the redundant configuration (Step 2005).

Next, a degradation process performed when physical server 2 fails will be described with reference to FIGS. 7 and 8.

Figure 7:
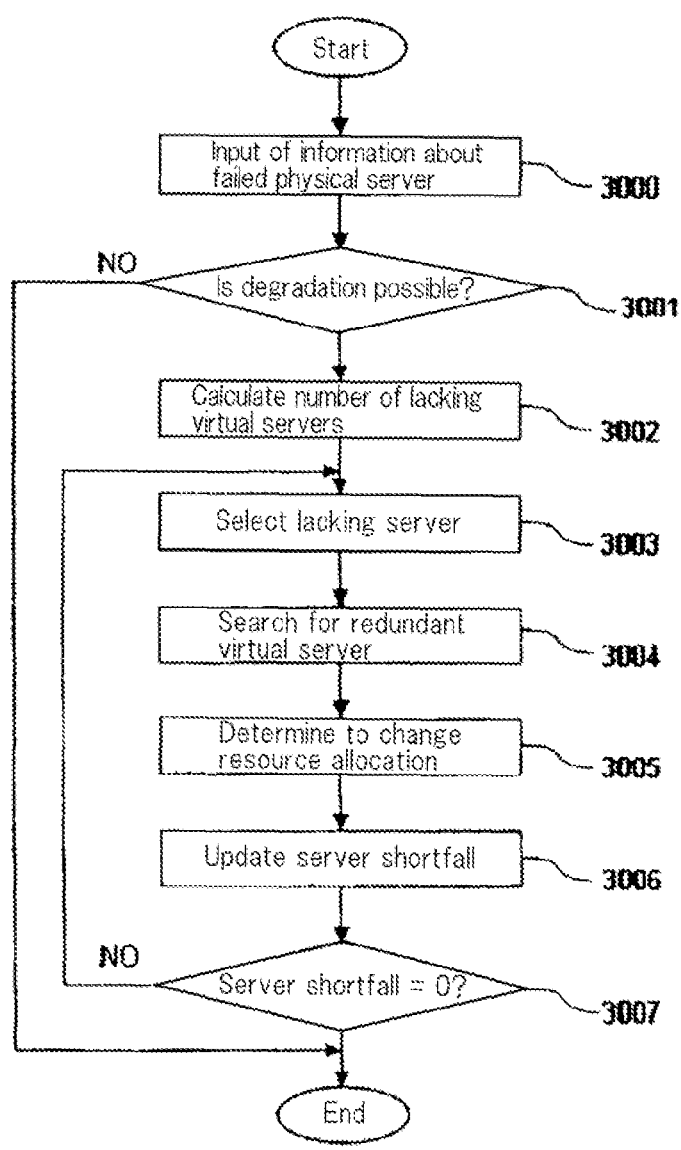
FIG. 7 is a flowchart showing processing procedures of the graceful degradation determining means shown in FIGS. 1 and 2.

FIG. 7 is a flowchart showing processing procedures of the graceful degradation determining means shown in FIGS. 1 and 2, and FIG. 8 is a flowchart showing processing procedures for graceful degradation design carried out by the virtual server management means and virtual server control means shown in FIG. 2.

As shown in FIG. 7, when a physical server fails, information about failed physical server 2 is inputted in graceful degradation determining means 13 via input means 11 (Step 3000). In the degradation process, it is necessary to design a redundant configuration (graceful degradation) so as to meet the minimum operating level, which is an availability requirement, for remaining physical servers 2 excluding failed physical server 2.

First, graceful degradation determining means 13 determines whether or not degradation is possible by comparing the number of failed physical servers 2 with the maximum allowable simultaneous fault count, which is an availability requirement (Step 3001). If the number of failed physical servers 2 exceeds the maximum allowable simultaneous fault count, since it is not possible to migrate to a graceful degradation, graceful degradation determining means 13 outputs a message indicating that degradation is not possible and thereby finishes processing.

On the other hand, if the number of failed physical servers 2 does not exceed the maximum allowable simultaneous fault count, since degradation is possible, graceful degradation determining means 13 makes server shortfall calculating means 131 calculate, for each subsystem (application), the insufficient number of virtual servers 3 (hereinafter referred to as server shortfall) in meeting the availability requirements and stores results of the calculation (server shortfall information) in server shortfall information storage 18 (Step 3002).

The number of lacking servers is determined by subtracting the number of active virtual servers remaining after occurrence of failure from an inputted availability requirement, i.e., the minimum number of virtual servers 3 (minimum server count) needed for each subsystem (application).

An example of server shortfall information is shown in FIG. 11. In the example shown in FIG. 11, the minimum server count for application A is "1," but the number of remaining virtual servers (hereinafter referred to as a remaining server count) is "0," and thus the server shortfall is "1." Graceful degradation determining means 13 designs a graceful degradation so as to compensate for the lacking server.

Next, graceful degradation determining means 13 starts the process of compensating for lacking virtual servers determined for each subsystem (application), using redundant virtual servers.

Graceful degradation determining means 13 makes resource allocation change determining means 132 select a subsystem (application) in which virtual servers 3 are lacking (Step 3003) and search for redundant virtual servers 3 allocated to the subsystem (application) (Step 3004). When any redundant virtual server allocated to the selected subsystem (application) is found, resource allocation change determining means 132 changes the quantity of computer resources allocated to the redundant virtual server (Step 3005).

As described above, when the quantity of computer resources allocated to a redundant virtual server is changed, the virtual server computer resources that are allocated to other subsystems (applications) are reduced, which may result in an insufficient number of servers.

Thus, graceful degradation determining means 13 makes server shortfall correction means 133 recalculate, for each subsystem (application), the number of lacking virtual servers 3 in meeting the availability requirements and updates the server shortfall information stored in server shortfall information storage 18 (Step 3006).

Server shortfall correction means 133 determines whether or not the server shortfall is "0" (Step 3007). If the server shortfall is "1" or larger, server shortfall correction means 133 returns to the process of Step 3003 and repeats the processes of Steps 3003 to 3007. Server shortfall correction means 133 repeats the processes of Steps 3003 to 3007 until the server shortfall becomes "0," and thereby determines a graceful degradation and outputs graceful degradation information which represents the graceful degradation.

An example of graceful degradation information is shown in FIG. 12. FIG. 12 shows an example of a degradation process carried out as a result of failure in the first physical server (physical server 1) using the graceful degradation shown in FIG. 10: a virtual server allocated to application A placed on the third physical server (physical server 3) is changed from redundant to active and a virtual server allocated to application C is changed from active to redundant.

The graceful degradation information outputted from graceful degradation determining means 13 is inputted in virtual server management means 14 and the degradation process is started. In so doing, the degradation process may be started either with or without approval by the administrator.

As shown in FIG. 8, when the graceful degradation information is inputted (Step 4000), virtual server management means 14 transmits a control request to virtual server control means 21 based on the graceful degradation information (Step 4001).

Upon receiving the control request (Step 4002), virtual server control means 21 performs the requested control (Step 4003) and transmits control results to virtual server management means 14 (Step 4004). Upon receiving the control results from virtual server control means 21 of all physical servers 2, virtual server management means 14 finishes the degradation process (Step 4005).

In case of failure, the graceful degradation designing system according to the present exemplary embodiment calculates the server shortfall for each subsystem (application) based on the availability requirements, changes the quantity of computer resources allocated to the remaining virtual servers, and thereby determines a graceful degradation, making it possible to migrate to the graceful degradation which meets the availability requirements, without depending on the failed physical server.

Also, since the graceful degradation designing system according to the present exemplary embodiment calculates the number of lacking servers resulting from the changes in the quantity of allocated computer resources and repeats changing the quantity of allocated computer resources until the new server shortfall becomes "0," it is possible to determine a graceful degradation which meets the availability requirements of each subsystem (application).

Furthermore, since the graceful degradation designing system according to the present exemplary embodiment switches between an active virtual server and redundant virtual server by simply changing the quantity of computer resources allocated to virtual servers 3, it is possible to design a graceful degradation quickly without stopping the computer system.

EXAMPLES

Next, the examples will be described with reference to the drawings.

Figure 13:
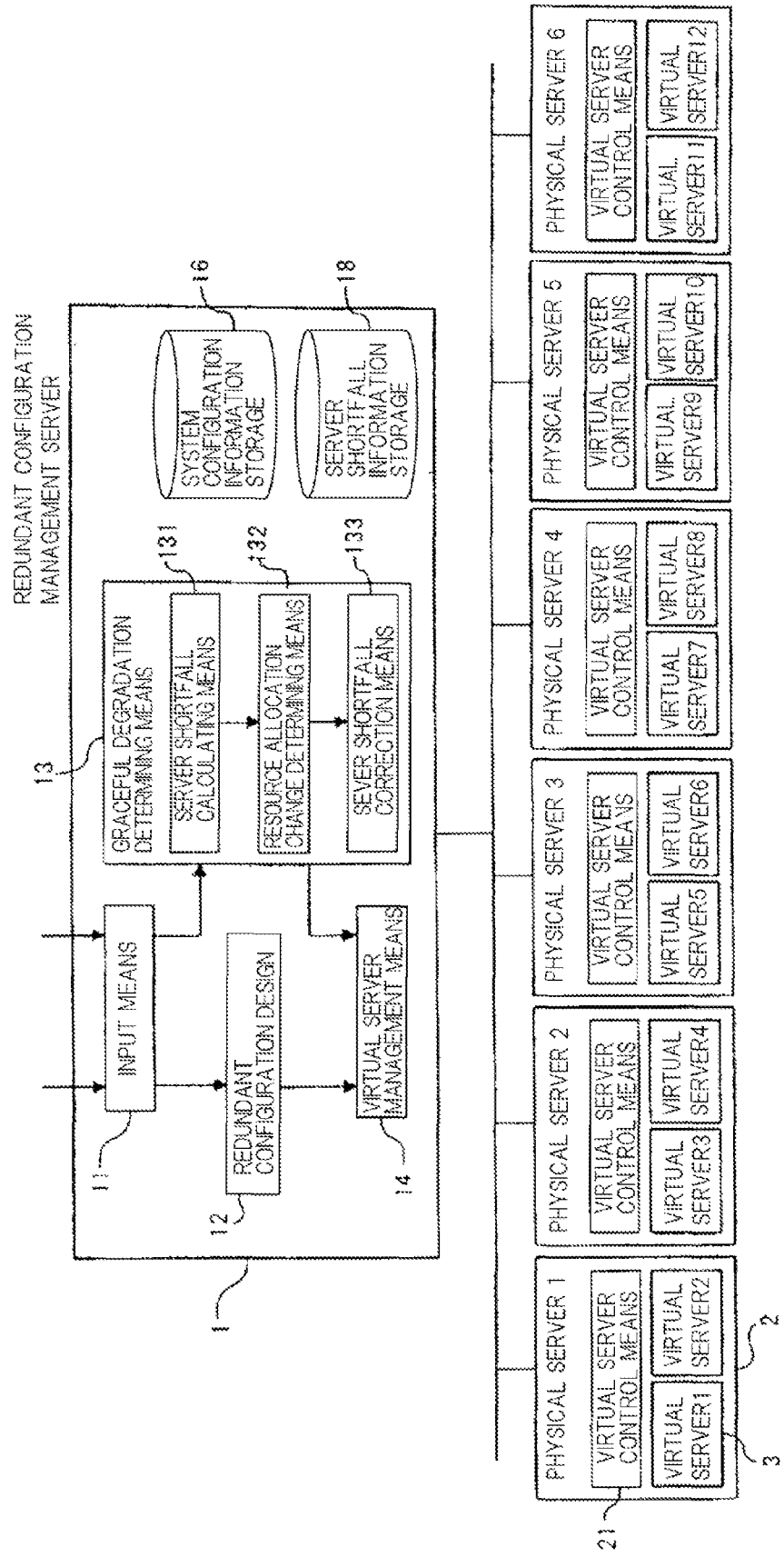
FIG. 13 is a block diagram showing a configuration of an example of the graceful degradation designing system.

FIG. 13 is a block diagram showing a configuration of an example of the graceful degradation designing system.

The graceful degradation designing system shown in FIG. 13 is equipped with six physical servers 2 to be managed and configured such that two virtual servers operate on each physical server 2.

FIG. 14 is a table showing an example of system configuration information used by the graceful degradation designing system shown in FIG. 13.

As shown in FIG. 14, the system configuration information according to the present example includes information about allocation of active virtual servers 3 to six physical servers 2, where each active virtual server 3 is running on one of three subsystems (applications).

In the example shown in FIG. 14, active virtual servers of application A are allocated to the first physical server (physical server 1), to second physical server (physical server 2) and to third physical server (physical server 3), active virtual servers of application B are allocated to the fourth physical server (physical server 4) and to fifth physical server (physical server 5), and an active virtual server of application C is allocated to the sixth physical server (physical server 6).

In the present example, it is assumed that availability requirements shown in FIG. 15 are inputted in the graceful degradation designing system shown in FIG. 13. As shown in FIG. 15, availability requirements according to the present example are such that the maximum allowable simultaneous fault count is "3" and that the minimum server count per application, specified as the minimum operating level, is "1."

It is assumed that redundant configuration design means 12 determines placement of virtual servers 3 with respect to physical servers 2 so as to meet the availability requirements shown in FIG. 15 and outputs virtual server placement information such as shown in FIG. 16. In the example shown in FIG. 16, redundant virtual servers of application B are allocated to the first physical server (physical server 1) and to second physical server (physical server 2), redundant virtual servers of application C are allocated to the third physical server (physical server 3), to fourth physical server (physical server 4) and to fifth physical server (physical server 5), and a redundant virtual server of application A is allocated to the sixth physical server (physical server 6).

Even if any of the three physical servers fail, the virtual server placement information shown in FIG. 16 allows the graceful degradation designing system shown in FIG. 13 to migrate to a graceful degradation which meets the availability requirements, by simply changing the quantity of computer resources allocated to virtual servers.

A degradation process carried out when a physical server fails will be described with reference to the flowchart shown in FIG. 7.

As shown in FIG. 7, when, for example, the administrator enters information about a failed physical server via input means 11 (Step 3000), graceful degradation determining means 13 determines whether or not it is possible to migrate to a graceful degradation which meets the availability requirements (Step 3001).

FIG. 17 shows an example of failure information used to identify failed physical servers. As shown in FIG. 17, it is assumed that the first physical server (physical server 1), second physical server (physical server 2), and third physical server (physical server 3) have failed out of the six physical servers in the graceful degradation designing system shown in FIG. 13.

Since the number of failed physical servers is three, which does not exceed the maximum allowable simultaneous fault count prescribed by the availability requirement shown in FIG. 15, graceful degradation determining means 13 determines that degradation is possible.

Next, graceful degradation determining means 13 makes server shortfall calculating means 131 calculate, for each subsystem (application), the number of lacking virtual servers 3 (server shortfall) in meeting the availability requirements and stores information about the results of the calculation (server shortfall information) in server shortfall information storage 18 (Step 3002).

FIG. 18 shows an example of server shortfall information calculated by server shortfall calculating means 131.

As shown in FIG. 18, according to the present example, since there is one lacking server in application A, graceful degradation determining means 13 makes resource allocation change determining means 132 select application A (Step 3003) and search for redundant virtual server 3 that is allocated to the subsystem (application A) (Step 3004).

When a redundant virtual server that is allocated to application A is found, resource allocation change determining means 132 changes the quantity of computer resources allocated to the redundant virtual server (Step 3005).

When resource allocation change determining means 132 changes the quantity of allocated computer resources, lacking servers may newly occur in other subsystems (applications). Thus, graceful degradation determining means 13 makes server shortfall correction means 133 recalculate the server shortfall for each subsystem (application) and stores the results of the calculation in server shortfall information storage 18 and thereby updates the server shortfall information (Step 3006).

Next, graceful degradation determining means 13 determines whether or not the server shortfall is "0." If the server shortfall is not "0," graceful degradation determining means 13 returns to the process of Step 3003 and repeats the processes of Steps 3003 to 3007. Graceful degradation determining means 13 repeats the processes of Steps 3003 to 3007 until the server shortfall becomes "0," and thereby determines a graceful degradation to migrate to.

Graceful degradation design procedures will be described in more detail with reference to FIG. 19.

Figure 19:
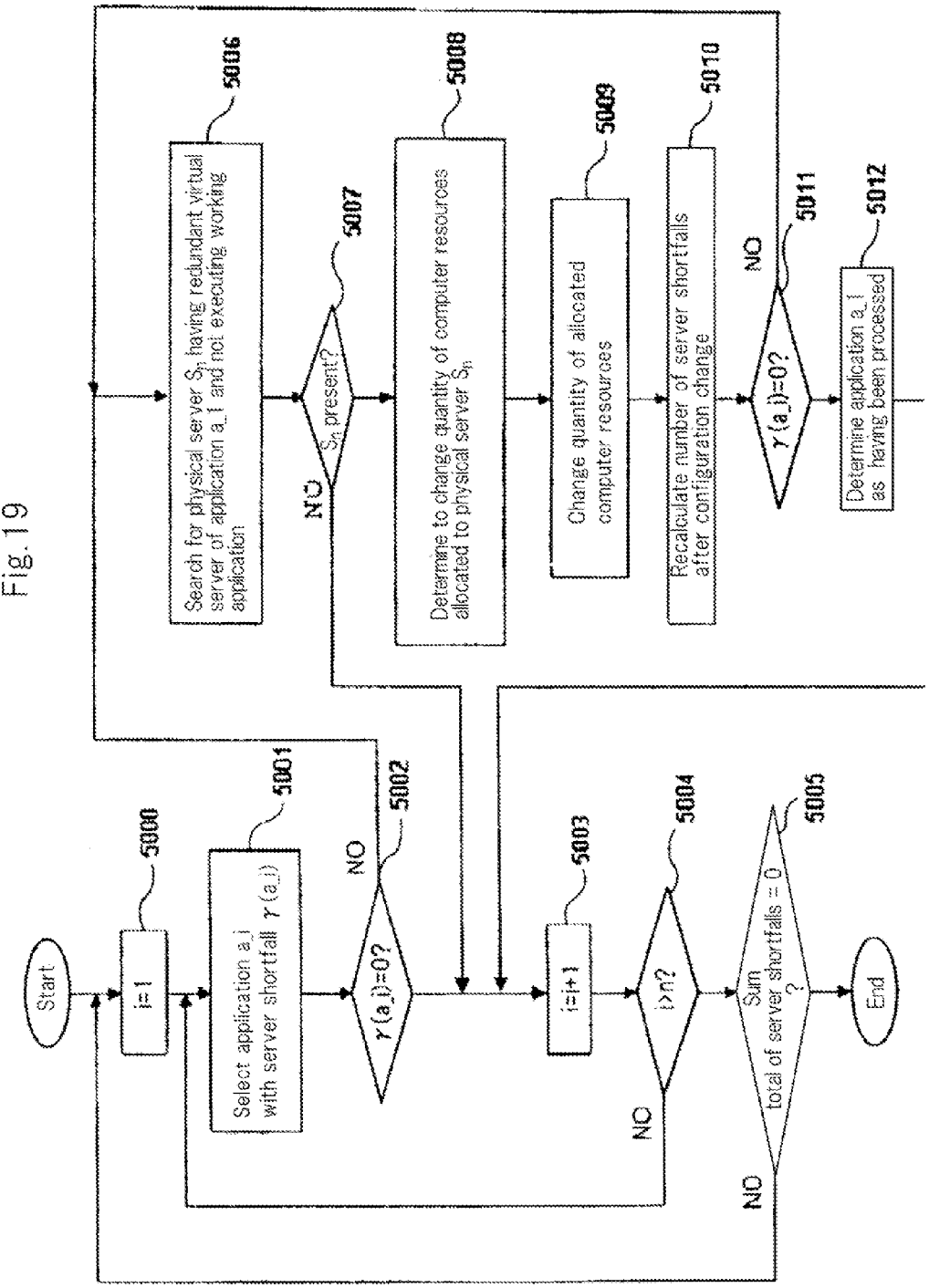
FIG. 19 is a flowchart showing graceful degradation design procedures carried out by graceful degradation determining means shown in FIG. 13.

As shown in FIG. 19, first, graceful degradation determining means 13 initializes value of variable i (i=1) (Step 5000). Each application is defined as $a\_i$, with application A being $a\_1$, application B being $a\_2$, and application C being $a\_3$. Also, the server shortfall in each application $a\_i$ is designated as $\gamma(a\_i)$.

Next, graceful degradation determining means 13 selects application $a\_i$ (Step 5001) and determines whether or not server shortfall $\gamma(a\_i)$ in the selected application is "0" (Step 5002).

According to the present example, since $\gamma(a\_1)=1$ as shown in the example in FIG. 18, graceful degradation determining means 13 searches for any physical server Sn to which a redundant virtual server of application $a\_1$ is allocated and in which an operating virtual server is not executing an application process (Step 5006).

Graceful degradation determining means 13 determines whether or not any physical server Sn exists (Step 5007). If no physical server Sn exists, graceful degradation determining means 13 goes to the process of Step 5003.

In this case, since the sixth physical server (physical server 6) is detected, graceful degradation determining means 13 determines to change the quantity of computer resources allocated to the sixth physical server (Step 5008).

Since the sixth physical server is executing a process of application C ($a\_3$) using an operating virtual server, graceful degradation determining means 13 changes the quantity of allocated computer resources to decrease the remaining server count of application $a\_3$ by "1" and to increase the remaining server count of application $a\_1$ by "1" (Step 5009).

When the quantity of allocated computer resources is changed, graceful degradation determining means 13 recalculates the server shortfalls (Step 5010). In this case, server shortfall information after the recalculation is as shown in FIG. 20. In the example shown in FIG. 20, after the quantity of allocated computer resources is changed, a lacking server newly occurs in application C ($a\_3$). The server shortfall information after the recalculation is stored in server shortfall information storage 18.

Next, graceful degradation determining means 13 determines whether or not server shortfall $\gamma(a\_1)$ of the selected application ($a\_1$ in this case) is "0" (Step 5011). In this case, since $\gamma(a\_1)=0$, graceful degradation determining means 13 determines application $a\_1$ as having been processed (Step 5012) and then goes to the process of Step 5003 to set i=2 and to determine whether or not the value of i has exceeded number n of applications (Step 5004).

According to the present example, since n=3, graceful degradation determining means 13 returns to the process of Step 5001 and repeats the above processes for application $a\_2$.

First, graceful degradation determining means 13 selects application $a\_2$ (Step 5001) and determines whether or not server shortfall $\gamma(a\_2)$ in the selected application is "0" (Step 5002).

According to the present example, since $\gamma(a\_2)=0$ as shown in the example in FIG. 18, graceful degradation determining means 13 goes to the process of Step 5003 to set i=3 and to determine whether or not the value of i has exceeded number n of applications (Step 5004).

According to the present example, since n=3, graceful degradation determining means 13 returns to the process of Step 5001 and repeats the above processes for application $a\_3$.

First, graceful degradation determining means 13 selects application $a\_3$ (Step 5001) and determines whether or not server shortfall $\gamma(a\_2)$ in the selected application is "0" (Step 5002).

According to the present example, as shown in FIG. 20, since server shortfall $\gamma(a\_3)$ in application $a\_3$ is "1" when the server shortfall is recalculated, graceful degradation determining means 13 searches for any physical server Sn to which a redundant virtual server of application $a\_3$ is allocated and in which an operating virtual server is not executing an application process (Step 5006).

Graceful degradation determining means 13 determines whether or not any physical server Sn exists (Step 5007). If no physical server Sn exists, graceful degradation determining means 13 goes to the process of Step 5003.

In this case, since the fourth physical server (physical server 4) is detected, graceful degradation determining means 13 determines to change the quantity of computer resources allocated to the fourth physical server (Step 5008).

Since the fourth physical server is executing a process of application B ($a\_2$) using an operating virtual server, graceful degradation determining means 13 changes the quantity of allocated computer resources to decrease the remaining server count of application $a\_2$ by "1" and to increase the remaining server count of application $a\_3$ by "1" (Step 5009).

When the quantity of allocated computer resources is changed, graceful degradation determining means 13 recalculates the server shortfalls (Step 5010). In this case, server shortfall information after the recalculation is as shown in FIG. 21.

In the example shown in FIG. 21, after the quantity of allocated computer resources is changed, the server shortfalls of all the applications are "0." The server shortfall information after the recalculation is stored in server shortfall information storage 18.

Next, graceful degradation determining means 13 determines whether or not server shortfall $\gamma(a\_3)$ of the selected application ($a\_3$ in this case) is "0" (Step 5011). In this case, since $\gamma(a\_3)=0$, graceful degradation determining means 13 determines application $a\_3$ as having been processed (Step 5012) and then goes to the process of Step 5003 to set i=4 and to determine whether or not the value of i has exceeded number n of applications (Step 5004).

According to the present example, since n=3, graceful degradation determining means 13 goes to the process of Step 5005 and calculates the sum total of the server shortfalls in all the applications. Then, graceful degradation determining means 13 determines whether or not the sum total of the server shortfalls is "0." If the sum total of the server shortfalls is "0," graceful degradation determining means 13 finishes processing. If the sum total of the server shortfalls is not "0,"

graceful degradation determining means 13 returns to the process of Step 5001 and repeats the processes of Steps 5001 to 5012.

As a result of the above-described processes, the quantity of computer resources allocated to the fourth physical server and sixth physical server is changed, producing graceful degradation information such as shown in FIG. 22. In the example shown in FIG. 22, an active virtual server of application C and a redundant virtual server of application B are allocated to the fourth physical server (physical server 4) and an active virtual server of application A and a redundant virtual server of application C are allocated to the sixth physical server (physical server 6).

Once the graceful degradation information is obtained, the redundant configuration of the computer system is changed according to the procedures shown in FIG. 8. According to the present example, active and redundant virtual servers are interchanged by changing the quantity of allocated computer resources of the virtual servers placed on the fourth physical server and sixth physical server. Since changes in the quantity of allocated computer resources are finished soon, the degradation process can be performed quickly.

With the graceful degradation designing system according to the present example, even if lacking servers occur in other applications when the quantity of computer resources that are allocated to a virtual server is changed, since virtual servers whose quantity of computer resource allocation needs to be changed are searched for repeatedly by updating the server shortfall information, it is possible to determine a graceful degradation which meets availability requirements.

The present invention has been described with reference to an exemplary embodiment, but the present invention is not limited to the exemplary embodiment described above and various modifications to the configuration and details of the present invention will become apparent to those skilled in the art without departing from the scope of the present invention.

The invention claimed is:

1. A graceful degradation designing system comprising:
    input means that is used to enter information about a failed physical server; and
    graceful degradation determining means that determines a graceful degradation which meets an availability requirement specified in advance, wherein said availability requirement is met by calculating, for each subsystem executing processing programs on a computer system, the number of processing programs which are insufficient to meet said availability requirement and is met by changing a quantity of computer resources allocated to said processing programs, based on the entered information,
    wherein said processing programs implement virtual servers,
    and wherein said graceful degradation determining means comprises:
    server shortfall calculating means that calculates, for each subsystem, the number of virtual servers which are insufficient to meet said availability requirement;
    resource allocation change determining means that changes a quantity of computer resources allocated to said virtual servers so that the number of virtual servers which are insufficient in each of said subsystems will be zero; and
    server shortfall correction means that recalculates, for each of said subsystems, the number of virtual servers which are insufficient to meet said availability requirement after the change in the quantity of allocated computer resources.

2. The graceful degradation designing system according to claim 1, further comprising:
    virtual server management means that outputs a control request to manage said virtual servers placed on said physical servers based on graceful degradation information which represents said graceful degradation; and
    virtual server control means that controls configuration of said virtual servers placed on said physical servers based on said control request.

3. The graceful degradation designing system according to claim 2, further comprising:
    redundant configuration design means that makes said computer system redundant and that determines placement of said virtual servers with respect to said physical servers so as to meet said availability requirement, wherein
    said virtual server management means outputs a control request intended to manage said virtual servers placed on said physical servers, based on said graceful degradation information and on redundant configuration information which represents the placement of said virtual servers determined by said redundant configuration design means.

4. A graceful degradation designing method comprising:
    calculating, for each subsystem executing on a computer system, the number of processing programs which are insufficient to meet an availability requirement specified in advance when information about a failed physical server is inputted, said processing programs implementing virtual servers;
    determining a graceful degradation which meets said availability requirement by changing the quantity of computer resources allocated to processing programs;
    calculating, for each subsystem, the number of virtual servers which are insufficient to meet said availability requirement;
    changing a quantity of computer resources allocated to said virtual servers so that the number of virtual servers which are insufficient in each of said subsystems will be zero; and
    recalculating, for each of said subsystems, the number of virtual servers which are insufficient in meeting said availability requirement after the change in the quantity of allocated computer resources.

5. The graceful degradation designing method according to claim 4, further comprising:
    outputting a control request to manage said virtual servers placed on said physical servers based on graceful degradation information which represents said graceful degradation; and
    controlling a configuration of said virtual servers placed on said physical servers based on said control request.

6. The graceful degradation designing method according to claim 5, further comprising:
    making said computer system redundant and determining placement of said virtual servers with respect to said physical servers so as to meet said availability requirement; and
    managing said virtual servers placed on said physical servers, based on said graceful degradation information and on redundant configuration information which represents the determined placement of said virtual servers.

7. A graceful degradation design server, comprising:
    input means that is used to enter an availability requirement of a computer system and information about a failed physical server;

redundant configuration design means that makes said computer system redundant and that determines placement of a virtual server with respect to said physical server so as to meet said availability requirement;

graceful degradation determining means that determines a graceful degradation which meets an availability requirement specified in advance, wherein said availability requirement is met by calculating, for each subsystem executing processing programs on said computer system, the number of virtual servers which are insufficient to meet said availability requirement and is met by changing a quantity of computer resources allocated to said virtual servers, based on the entered information; and virtual server management means that outputs a control request to manage said virtual servers placed on said physical servers based on graceful degradation information which represents said graceful degradation, wherein said processing programs implement virtual servers, and wherein said graceful degradation determining means comprises:

server shortfall calculating means that calculates, for each subsystem, the number of virtual servers which are insufficient to meet said availability requirement;

resource allocation change determining means that changes a quantity of computer resources allocated to said virtual servers so that the number of virtual servers which are insufficient in each of said subsystems will be zero; and server shortfall correction means that recalculates, for each of said subsystems, the number of virtual servers which are insufficient to meet said availability requirement after the change in the quantity of allocated computer resources.

* * * * *